United States Patent
Lin

(10) Patent No.: US 7,210,212 B2
(45) Date of Patent: May 1, 2007

(54) BAYONET COLLET PICKUP TOOL FOR AGILE FIXTURING

(75) Inventor: Yhu-Tin Lin, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 189 days.

(21) Appl. No.: 11/112,218

(22) Filed: Apr. 22, 2005

(65) Prior Publication Data

US 2006/0017237 A1 Jan. 26, 2006

Related U.S. Application Data

(60) Provisional application No. 60/589,689, filed on Jul. 21, 2004.

(51) Int. Cl.
*B23Q 7/04* (2006.01)
*B23B 31/12* (2006.01)
*B23B 31/113* (2006.01)

(52) U.S. Cl. .................. 29/559; 279/4.08; 279/51; 279/93; 279/137; 483/55

(58) Field of Classification Search ................ 29/559; 279/4.07, 4.08, 51, 89, 93, 137; 483/54, 483/55
See application file for complete search history.

(56) References Cited

U.S. PATENT DOCUMENTS

| | | | | |
|---|---|---|---|---|
| 1,494,859 A | * | 5/1924 | Miller et al. ................ 279/93 |
| 2,476,874 A | * | 7/1949 | Johansson ................... 279/49 |
| 2,773,693 A | * | 12/1956 | Chittenden .................. 279/48 |
| 2,985,457 A | * | 5/1961 | Sima ........................... 279/93 |
| 3,195,909 A | * | 7/1965 | Winnen ....................... 279/51 |
| 3,618,962 A | * | 11/1971 | Cox et al. .................... 279/82 |
| 4,023,815 A | * | 5/1977 | Dunham ................... 279/46.6 |
| 4,197,044 A | * | 4/1980 | Cummings ................ 409/232 |
| 5,160,150 A | * | 11/1992 | Schmidt ...................... 279/58 |
| 6,257,595 B1 | * | 7/2001 | Difasi et al. ................. 279/50 |
| 6,832,433 B2 | * | 12/2004 | Kramer ....................... 29/558 |

FOREIGN PATENT DOCUMENTS

JP 02065906 A * 3/1990

* cited by examiner

*Primary Examiner*—Monica Carter
*Assistant Examiner*—Eric A. Gates
(74) *Attorney, Agent, or Firm*—Kathryn A. Marra

(57) ABSTRACT

A bayonet collet pickup tool includes a collet chuck having a collet portion including a bore disposed therein. A collet is held in the bore and is operable therein. A bayonet cap is mounted to an outer surface of the collet chuck proximate the bore. The bayonet cap includes a tubular socket concentric with the bore, at least one pair of diametrically opposed linear slots adjacent the socket, and a circular ledge adjacent the socket and perpendicular to the slots. A part including a shaft and at least one pair of diametrically opposed pins projecting from the shaft is receivable in the bayonet cap and the bore. Rotating the collet chuck while the pins are level with the ledge and then closing the collet releasably retains the part in the tool.

16 Claims, 3 Drawing Sheets

BAYONET COLLET PICKUP TOOL FOR AGILE FIXTURING

CROSS-REFERENCE TO RELATED APPLICATIONS

This application claims priority from U.S. Provisional Patent Application No. 60/589,689 filed Jul. 21, 2004.

TECHNICAL FIELD

This invention relates to automated devices, and more particularly to tools for automated devices for use in agile fixturing.

BACKGROUND OF THE INVENTION

Automated devices, such as robots, include a manipulator, such as an arm, a spindle, or any other movable structure, whose movement is controlled by a computer. To increase the functionality of the automated device, the manipulator is typically fitted with an adapter for accepting different tools. Each of the different tools allows the manipulator to perform a different function. The adapter may accept, for example, machining tools, grasping tools, welding tools, etc. These different tools are typically stored in a tool magazine, and the automated device may be programmed to retrieve the different tools from the tool magazine as the tools are needed to perform various procedures.

One type of tool, known as a pickup tool or a pick-and-place tool, allows the manipulator to pick up a part, move the part to a desired location, and release the part at the desired location. One application of a pickup tool is in automated machining, such as, for example, computer automated machining (CAM), computer numerical control (CNC) machining, or robotic machining. In automated machining, for example, a pickup tool may be used to reconfigure a modular fixture. Configuration of a modular fixture is known as agile fixturing.

In automated machining, and more particularly agile fixturing, a fixture is a mechanical structure that supports a part being machined. A modular fixture is a fixture that can be reconfigured for use with different parts. A modular fixture may include a base to which various fixture elements, such as fixture locators, are removably attached. The base may be magnetic and the fixture elements, which act as supports for the part being machined, may be magnetically engaged with the base. Using a pickup tool, the manipulator may position the various fixture elements on the fixture base to correspond to the contours or other locating features of the part to be machined. The accuracy with which the manipulator locates the various fixture elements affects the accuracy with which the part is positioned relative to the automated machining device, and therefore the accuracy of the machining. Accordingly, for this and other applications, the pickup tool accepted by the manipulator must allow the pickup process to be performed accurately.

Furthermore, in agile fixturing, it is necessary for the pickup and reconfiguration operation to be reliable. Conventional pickup tools have a tendency to perform unreliably. For example, some conventional pickup tools do not have enough gripping force to overcome the magnetic force of the fixture base acting on a fixture element. This results in the fixture element slipping out of the pickup tool during a pickup operation, which is undesirable. Other pickup tools have a tendency to bind a fixture element inside the pickup tool, thereby resulting in the tool not being able to release the fixture element after picking it up.

SUMMARY OF THE INVENTION

The present invention provides a bayonet collet pickup tool for releasably retaining a part during a pickup operation by an automated device. The bayonet collet pickup tool includes a collet chuck having a collet portion including a bore disposed therein. A collet is held in the bore and operable therein. A bayonet cap is mounted to an outer surface of the collet chuck proximate the bore. The bayonet cap includes a tubular socket concentric with the bore, at least one pair of diametrically opposed linear slots adjacent the socket, and a circular ledge adjacent the socket and perpendicular to the slots. A part including a shaft and at least one pair of diametrically opposed pins projecting from the shaft is receivable in the bayonet cap and the bore. Rotating the collet chuck while the pins are level with the ledge and then closing the collet releasably retains the part in the tool.

In an exemplary embodiment, the bayonet cap may include two pairs of diametrically opposed linear slots. The slots may extend from one end of the socket through the ledge. The circular ledge may include at least one pair, preferably two pairs, of diametrically opposed grooves traversing the ledge. The pair(s) of diametrically opposed grooves may be offset 45 degrees angularly from the at least one pair of diametrically opposed linear slots. The collet chuck may have a mount portion opposite the collet portion for coupling the tool to a manipulator of an automated device and the collet may be air operated.

These and other features and advantages of the invention will be more fully understood from the following description of certain specific embodiments of the invention taken together with the accompanying drawings.

DESCRIPTION OF THE PREFERRED EMBODIMENT

Figure 1:
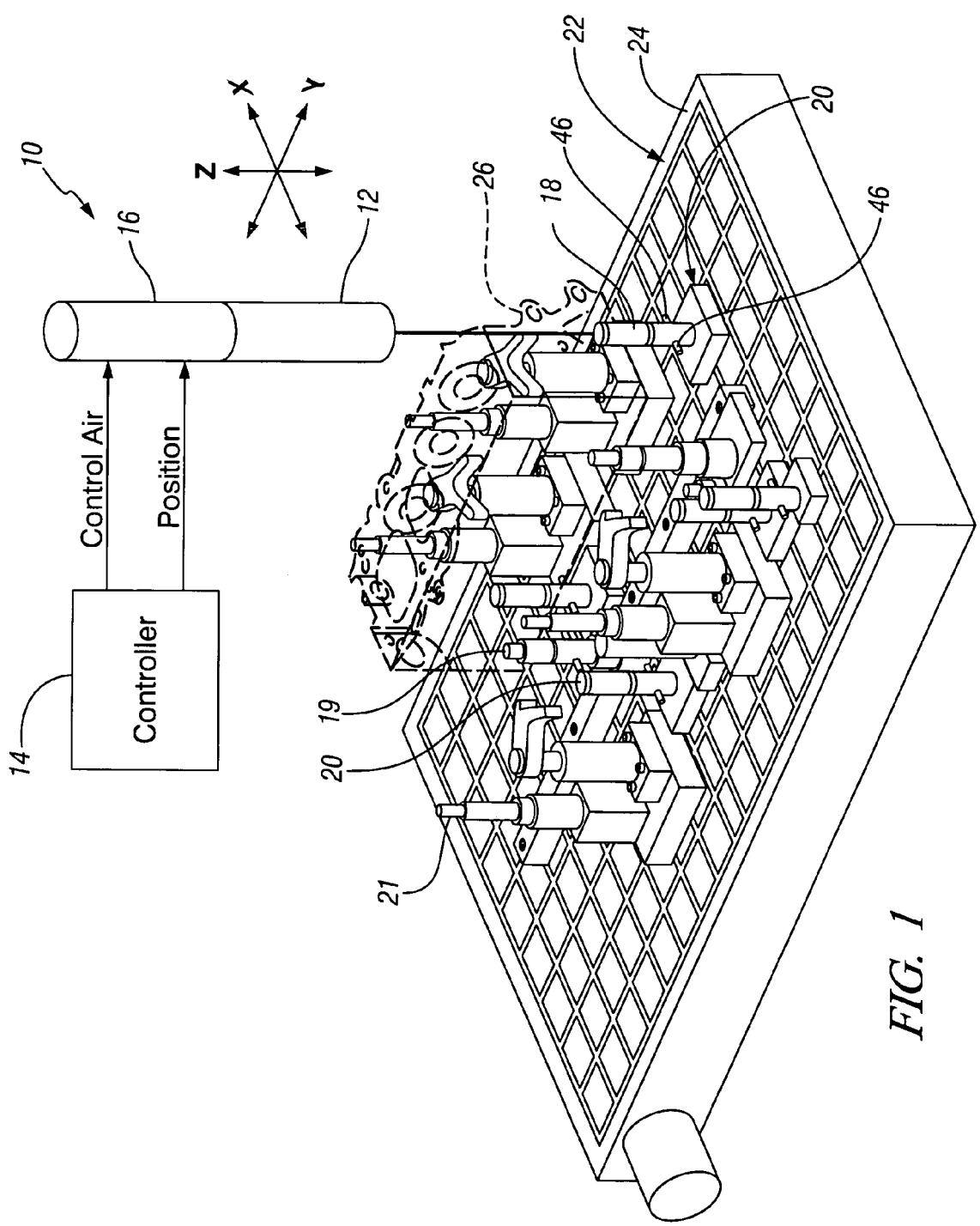
FIG. 1 is a schematic view of an automated device employing a pickup tool.

Referring to FIG. 1, a schematic view of an automated device 10 employing a pickup tool 12 is shown. Automated device 10 may be any robot or numerically controlled machine. Automated device 10 includes a controller 14, which provides directional input to a manipulator 16. Manipulator 16 may include an arm, a spindle, or any other movable structure, whose movement is controlled by the controller 14. Controller 14 directs the manipulator 16 in the x, y, and z directions to position the pickup tool 12 over a shaft 18 extending from a part 20 and, after the shaft 18 has been secured within the tool 12, to move the part 20 to a desired location and release the part 20 from the tool 12. Controller 14 also provides fluid (e.g., air, water, etc.) control signals to the pickup tool 12, via the manipulator 16, to activate gripping mechanisms, described hereinafter, within the tool 12 for use in securing and releasing the shaft 18 from the tool 12.

In the example shown in FIG. 1, the part 20 is a support within a modular fixture 22, and the automated device 10 is an automated machining center, such as, for example, a computer automated machining (CAM) center, a computer numerical control (CNC) machining center, or a robotic machining center. It will be recognized, however, that the pickup tool 12 may be employed for other purposes as well. In FIG. 1, the modular fixture 22 includes a number of different fixture elements, which include but are not limited to locators 19, supports 20, and clamps 21, removably attached to a base 24 through, for example, magnetic force. The pickup tool 12 can be equally applied to both the locators 19, clamps 21, and supports 20 since they share a common shaft 18 design for the tool 12 to pick up.

Using the pickup tool 12, the manipulator 16 positions the various locators 19 to correspond to contours or other locating features of a part to be machined 26, which is shown in phantom. After the locators 19 are located and secured in their appropriate positions, the part is then positioned on the fixtures, where it can be machined. Typically, the machining is performed by replacing the pickup tool 12 with a tool designed for machining the part 26. While the pickup tool may be used to pick up and place any part having a shaft 18, to simplify the following description, only supports 20 will be used to illustrate the inventive concept.

Figure 2:
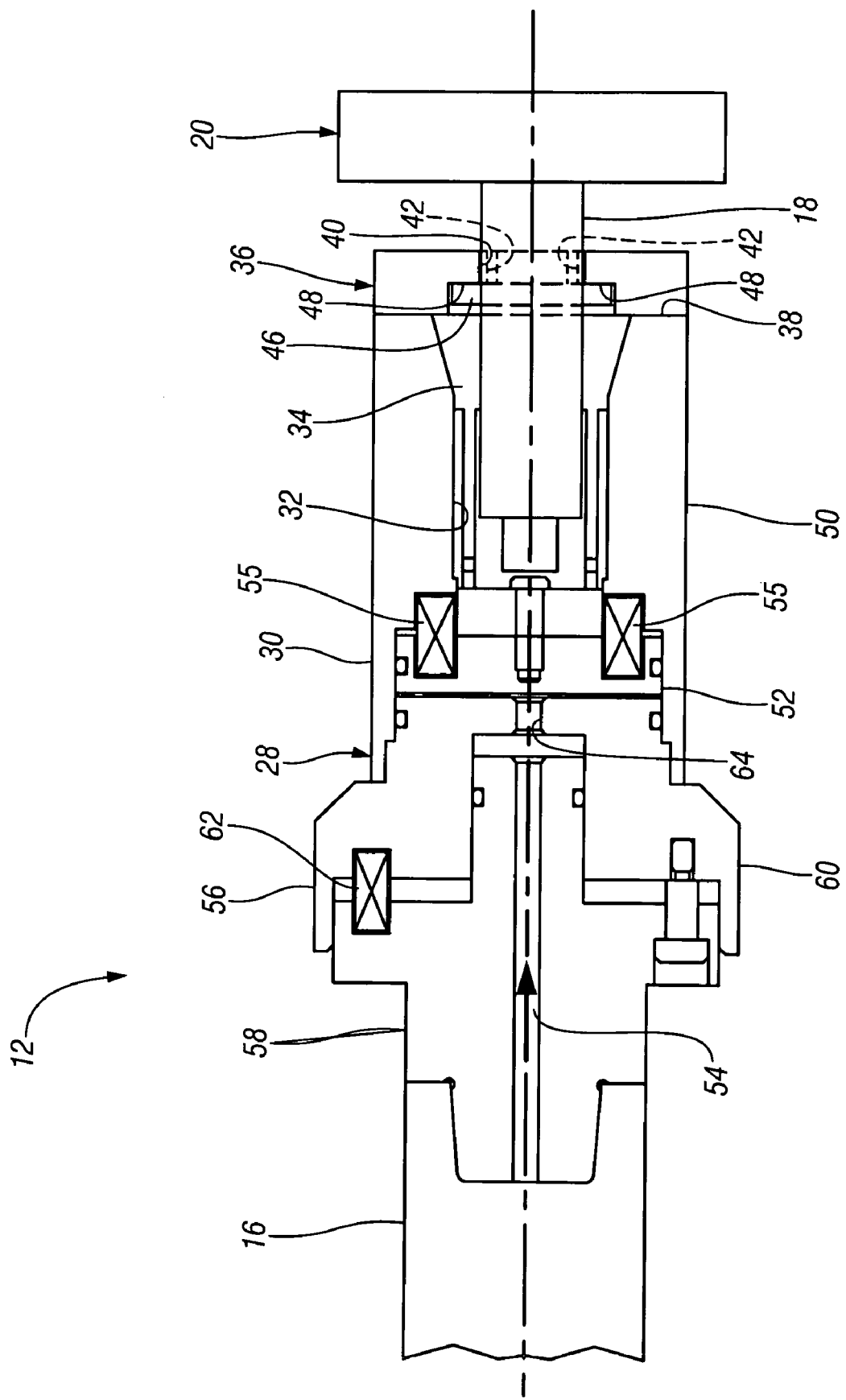
FIG. 2 is a cross-sectional view of the pickup tool.
Figure 3:
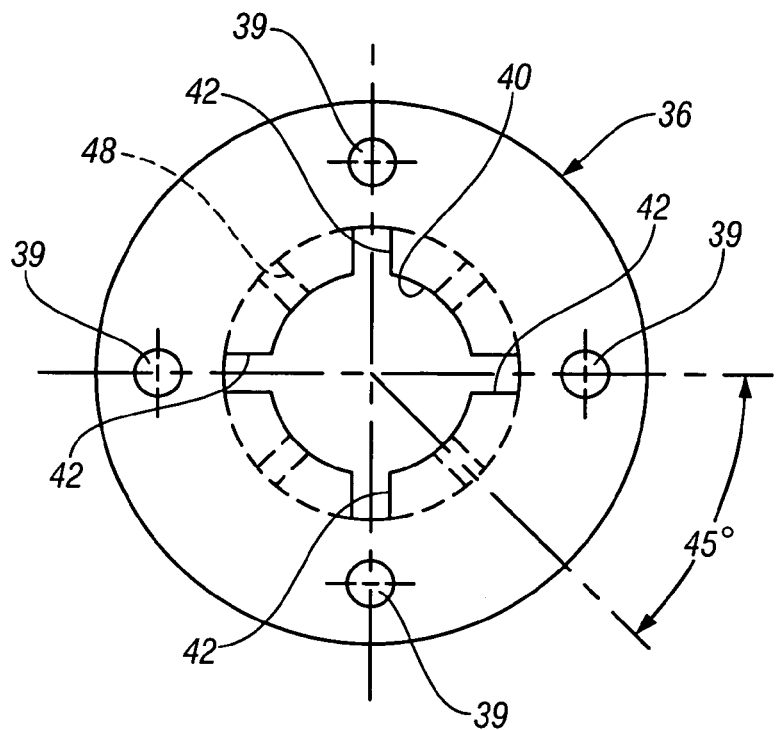
FIG. 3 is an end view of the pickup tool.
Figure 4:
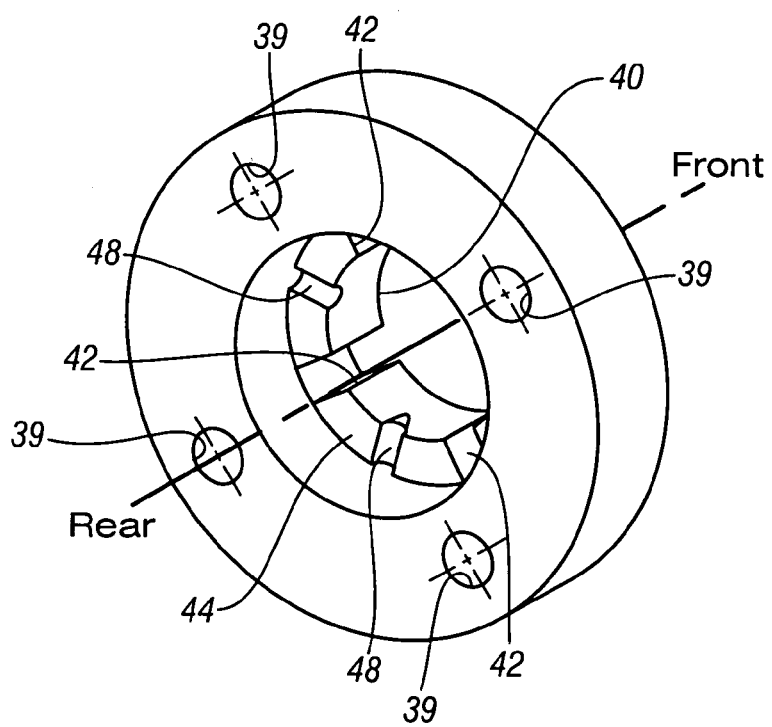
FIG. 4 is a perspective view of a bayonet cap of the pickup tool.

Referring now to FIGS. 2 through 4, a bayonet collet pickup tool 12 in accordance with the present invention includes a collet chuck 28 having a collet portion 30 including a bore 32 disposed therein. A collet 34 is held in the bore 32 and is operable therein. The collet chuck 28 may otherwise be any type of collet chuck suitable for the purposes described herein; any commercially available collet chuck tool may be utilized in the present invention.

A bayonet cap 36 is mounted to an outer surface 38 of the collet chuck 28 proximate the bore 32. The bayonet cap 36 may be mounted to the collet chuck 28 by fasteners 39. The bayonet cap 36 includes a tubular socket 40 concentric with the bore 32, at least one pair of diametrically opposed linear slots 42 adjacent the socket 40, and a circular ledge 44 adjacent the socket 40 and perpendicular to the slots 42. The slots 42 extend from one end of the socket 40 through the ledge 44. A part, such as a support 20, including a shaft 18 and at least one pair of diametrically opposed pins 46 projecting from the shaft 18, is receivable in the bayonet cap 36 and the bore 32. The pair of diametrically opposed pins 46 may also be a single through pin. Rotating the collet chuck 28 while the pins 46 are level with the ledge 44 and then closing the collet 34 releasably retains the part 20 in the tool 12.

In an exemplary embodiment, the bayonet cap 36 may include two pairs of diametrically opposed linear slots 42. Accordingly, in this arrangement, the part 20 may include two pairs of diametrically opposed pins 46, or two through pins, having a configuration corresponding to the configuration of the slots 42. The circular ledge 44 may include at least one pair of diametrically opposed grooves 48 traversing the ledge 44. In the case that the part 20 includes two pairs of pins 46, it is preferable for the circular ledge 44 to include two pairs of diametrically opposed grooves 48 arranged in a configuration corresponding to the configuration of the pins 46. The grooves 48 are not required but serve as detains to further secure the part 20 in the pickup tool 12 as described in more detail below. The at least one pair of diametrically opposed grooves 48 may be offset 45 degrees angularly from the at least one pair of diametrically opposed linear slots 42. The grooves 48, however, may be offset any angle from the slots 42 as long as the grooves are offset at least approximately a few degrees from the slots.

As stated above, the collet chuck 28 may be any commercially available collet chuck. A bayonet collet pickup tool 12 may be made by modifying such a commercial collet chuck with the addition of the bayonet cap 36 of the present invention. In an exemplary embodiment, the collet chuck 28 may include a body 50 having the bore 32 disposed therein. An actuator 52 may be operably connected to and in mechanical communication with the collet 34 for opening and closing the collet.

A fluid source, such as a controller 14 (FIG. 1), may be in fluid communication with the actuator 52 via a fluid passage 54. The fluid may be, for example, air. Movement of the actuator 52 in response to a fluid pressure from the fluid source opens the collet 24 and movement of the actuator 52 in response to a release of the fluid pressure closes the collet. The actuator 52 may be a piston mounted to the collet 34, and two resilient members 55, such as springs, may be connected between the piston and the collet chuck body 50. The resilient members 55 may be configured to bias the piston against the fluid pressure applied from the fluid source.

The collet chuck 28 may also have a mount portion 56 opposite the collet portion 30 for coupling the tool 12 to a manipulator 16 of an automated device 10. The mount portion 56 may include a mount 58 operably engaged with the body 50 for coupling the tool to a manipulator 16 of an automated device 10. The mount 58 includes the fluid passage 54 therein. A mount adapter 60 may be intermediate the actuator 52 and the mount 58, the mount adapter 60 being connected to the mount 58 by a resilient member 62 configured to absorb at least a portion of a force applied to the collet chuck body 50 during operation. The resilient member 62 may be, for example, a spring. The mount adapter 60 includes a hole 64 aligned with the fluid passage 54 of the mount 58 so that fluid pressure can be communicated from the fluid source to the actuator 52.

Referring to FIGS. 1 through 4, operation of the pickup tool 12 can be described. The pickup tool 12 may reside in a storage location such as a tool magazine (not shown) during operations in which it is not needed. When a pickup operation is required, such as when modular fixture 22 is to be reconfigured, the pickup tool 12 is selected and installed on an end of the manipulator 16. The manipulator 16 then aligns the bore 32 and socket 40 of the tool 12 with the shaft 18 of the part 20 and aligns the slots 42 of the bayonet cap 36 with the pins 46. With the shaft 18 and the pins 46 properly aligned, pressurized fluid is applied through the manipulator 16 or other outside source and is routed through the fluid passage 54 and hole 64 to the piston 52, as shown in FIG. 2. The force of the pressurized fluid overcomes the force of the resilient members 55 and drives the piston 52 towards the bore 32. The motion of the piston 52 simultaneously moves the mounted collet 34, thereby causing the collet to open.

The manipulator 16 then lowers the pickup tool 12 onto the part 20, thereby inserting the shaft 18 of the part through the bayonet cap 36 and into the collet 34. As the shaft 18 is inserted into the collet 34, the pins 46 of the part 20 are inserted into the slots 42 of the bayonet cap 36. When the pins 46 are level with the ledge 44 of the bayonet cap 36, the manipulator 16 turns about its axis to rotate the collet chuck 28 relative to the shaft 18 until the pins 46 are aligned with the grooves 48 in the ledge 44. The fluid pressure is then reduced, for example by venting to the atmosphere, which causes the force of the resilient members 55 to push the piston 52 away from the bore 32.

The collet 34 is thereby closed around the shaft 18 of the part 20. The manipulator 16 then exerts an upward pulling force on the part 20 by moving the collet chuck 28 upward in the z direction away from the base/surface 24 of the fixture 22. If the shaft 18 slips in the collet 34 as the part 20 is pulled away from the surface 24 due to the magnetic force of the surface 24 acting on the part 20, then the pins 46 of the part 20 come into contact with the grooves 48 and are detained therein. The part 20 is thereby releasably secured in the collet chuck 28. The part 20 can then be relocated to a new location as desired. To release the part 20, fluid pressure is again applied to the piston 52 to open the collet 34. The manipulator 16 then rotates the collet chuck 28 until the pins 46 are aligned with the slots 42, and moves the collet chuck 28 upward until the shaft 18 is entirely outside of the collet chuck.

In the event that the manipulator 16 is prevented from lowering the pickup tool 12 onto the shaft 18, for example due to misalignment of the shaft 18 with the socket 40 and bore 32, damage to the manipulator 16 and the tool 12 is prevented by the resilient member 62. The resilient member 62 is capable of absorbing at least a portion of the force of the pickup tool 12 contacting the shaft 18.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A bayonet collet pickup tool comprising:
   a collet chuck having a collet portion including a bore disposed therein;
   a collet held in said bore and operable therein; and
   a bayonet cap mounted to an outer surface of said collet chuck proximate said bore;
   said bayonet cap including a tubular socket concentric with said bore, at least one pair of diametrically opposed linear slots adjacent said socket, and a circular ledge adjacent said socket and perpendicular to said slots;
   wherein a part including a shaft and at least one pair of diametrically opposed pins projecting from said shaft is receivable in said bayonet cap and said bore, and rotating said collet chuck while said pins are level with said ledge and then closing said collet releasably retains said part in said tool.

2. The bayonet collet pickup tool of claim 1, wherein said bayonet cap includes two pairs of diametrically opposed linear slots.

3. The bayonet collet pickup tool of claim 1, wherein said circular ledge includes at least one pair of diametrically opposed grooves traversing said ledge.

4. The bayonet collet pickup tool of claim 3, wherein said circular ledge includes two pairs of said diametrically opposed grooves.

5. The bayonet collet pickup tool of claim 3, wherein said at least one pair of diametrically opposed grooves is offset 45 degrees angularly from said at least one pair of diametrically opposed linear slots.

6. The bayonet collet pickup tool of claim 1, wherein said slots extend from one end of said socket through said ledge.

7. The bayonet collet pickup tool of claim 1, wherein said collet is air operated.

8. The bayonet collet pickup tool of claim 1, wherein said collet chuck has a mount portion opposite said collet portion for coupling said tool to a manipulator of an automated device.

9. A pickup tool for releasably retaining a part during a pickup operation by an automated device, the part including a shaft and at least one pair of diametrically opposed pins projecting from said shaft, the pickup tool comprising:
   a collet chuck including a body having a bore disposed therein, a collet received in said bore for receiving said shaft, an actuator operably connected to and in mechanical communication with said collet for opening and closing said collet, and a fluid source in fluid communication with said actuator, wherein movement of the actuator in response to a fluid pressure from the fluid source opens said collet and movement of the actuator in response to a release of said fluid pressure closes said collet;
   a bayonet cap mounted to an outer surface of said collet chuck body proximate to and aligned with said bore;
   said bayonet cap including a tubular socket concentric with said bore, at least one pair of diametrically opposed linear slots adjacent said socket, and a circular ledge adjacent said socket and perpendicular to said slots;
   wherein the shaft of said part is receivable in said socket and in said collet, the pins of said part are receivable in the slots of said bayonet cap, and rotating said collet chuck while the pins of said shaft are level with said ledge and then closing said collet releasably retains said part in said tool.

10. The pickup tool of claim 9, wherein said collet chuck includes a mount operably engaged with said body for coupling the tool to said automated device.

11. The pickup tool of claim 10, wherein said collet chuck includes a mount adapter intermediate said actuator and said mount, said mount adapter being connected to said mount by a resilient member configured to absorb at least a portion of a force applied to said collet chuck body.

12. The pickup tool of claim 9, wherein said actuator includes a piston mounted to said collet and two resilient members connected between said piston and said collet chuck body, said resilient members configured to bias the piston against said fluid pressure.

13. The pickup tool of claim 9, wherein said bayonet cap includes two pairs of diametrically opposed linear slots.

14. The pickup tool of claim 9, wherein wherein said circular ledge includes at least one pair of diametrically opposed grooves traversing said ledge.

15. The pickup tool of claim 14, wherein said at least one pair of diametrically opposed grooves is offset 45 degrees angularly from said at least one pair of diametrically opposed linear slots.

16. A method of releasably retaining a part from a surface during a pickup operation by an automated device, the part including a shaft and at least one pair of diametrically opposed pins projecting from said shaft, the method comprising the steps of:
   providing a bayonet collet pickup tool including: a collet chuck having a collet portion including a bore disposed therein; a collet held in said bore and operable therein; and a bayonet cap mounted to an outer surface of said collet chuck proximate said bore; said bayonet cap including a tubular socket concentric with said bore, at least one pair of diametrically opposed linear slots adjacent said socket, and a circular ledge adjacent said socket and perpendicular to said slots; said circular ledge having at least one pair of diametrically opposed grooves traversing said ledge; wherein the part is receivable in said bayonet cap and said bore;

opening the collet of the collet chuck;

inserting the shaft of the part through the bayonet cap and into the collet;

when the pins of the part are level with the ledge of said bayonet cap, rotating the chuck relative to the shaft of the part until the pins are aligned with the grooves in the ledge;

closing the collet of the collet chuck around the shaft of the part;

exerting an upward pulling force on the part by moving the collet chuck upward away from the surface; and if the shaft slips in the collet as the part is pulled away from the surface, then detaining the part in the grooves so the part is releasably secured in the collet chuck.

* * * * *